United States Patent
Sugibayashi et al.

(10) Patent No.: US 8,342,026 B2
(45) Date of Patent: Jan. 1, 2013

(54) VIBRATING GYROSCOPE

(75) Inventors: Hideaki Sugibayashi, Toyama (JP); Keiichi Okano, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 383 days.

(21) Appl. No.: 12/479,935

(22) Filed: Jun. 8, 2009

(65) Prior Publication Data

US 2009/0314084 A1 Dec. 24, 2009

(30) Foreign Application Priority Data

Jun. 23, 2008 (JP) ................................ 2008-162888

(51) Int. Cl.
*G01C 19/56* (2006.01)
(52) U.S. Cl. .................................... 73/504.16
(58) Field of Classification Search ............... 73/504.12, 73/504.14, 504.16
See application file for complete search history.

(56) References Cited

U.S. PATENT DOCUMENTS

| | | | |
|---|---|---|---|
| 6,281,618 B1 | 8/2001 | Ishitoko et al. | |
| 7,654,139 B2 * | 2/2010 | Watanabe et al. | 73/504.12 |
| 2007/0256497 A1 | 11/2007 | Ishikawa et al. | |
| 2008/0041155 A1 * | 2/2008 | Pan et al. | 73/504.16 |
| 2009/0007665 A1 | 1/2009 | Kurakawa | |

FOREIGN PATENT DOCUMENTS

| | | |
|---|---|---|
| EP | 0 572 976 A | 1/1993 |
| JP | 05-333038 A | 12/1993 |
| JP | 07-019878 A | 1/1995 |
| JP | 07-301533 A | 11/1995 |
| JP | 09-210691 A | 8/1997 |
| JP | 2000-304546 A | 11/2000 |
| JP | 3698787 A | 9/2005 |
| JP | 2006-322874 A | 11/2006 |
| JP | 2007-285977 A | 11/2007 |
| JP | 2007-292660 A | 11/2007 |
| WO | 2007/125615 A1 | 11/2007 |

OTHER PUBLICATIONS

Official Communication issued in corresponding Japanese Patent Application No. 2008-162888, mailed on Apr. 27, 2010.

* cited by examiner

*Primary Examiner* — John Chapman, Jr.
(74) *Attorney, Agent, or Firm* — Keating & Bennett, LLP

(57) ABSTRACT

A vibrating gyroscope includes two input buffers each arranged to input voltage signals appearing at respective detection electrodes of one of two piezoelectric vibrators. An adding circuit adds up output voltages of the respective input buffers. An amplitude control circuit automatically controls a loop gain such that an output voltage of the adding circuit has a substantially constant amplitude. A phase-shift circuit controls the phase of a drive voltage supplied to the piezoelectric vibrators such that the piezoelectric vibrators oscillate by positive feedback. Two differential amplifier circuits each amplify a voltage difference corresponding to an angular velocity about an axis. Two synchronous detection circuits each perform detection using a synchronizing signal generated from an oscillation signal, and detect a voltage signal corresponding to the angular velocity.

4 Claims, 9 Drawing Sheets

VIBRATING GYROSCOPE

BACKGROUND OF THE INVENTION

1. Field of the Invention

The present invention relates to a vibrating gyroscope including piezoelectric vibrators.

2. Description of the Related Art

Many digital video cameras and digital still cameras include an angular velocity sensor capable of detecting camera shake in order to correct motion blur caused by a shaking hand.

Such an angular velocity sensor drives piezoelectric vibrators, detects an electromotive voltage generated by vibrations of the piezoelectric vibrators caused by Coriolis force, and outputs a voltage signal corresponding to an angular velocity.

To correct motion blur caused by hand shake as described above, it is necessary to detect an angular velocity about a vertical axis (horizontal vibrations) and an angular velocity about a horizontal axis (vertical vibrations). To do this, a single sensor must have two detection axes perpendicular or substantially perpendicular to each other.

Conventionally, a two-axis vibrating gyroscope includes two sets each including a tuning-fork piezoelectric vibrator, a drive circuit (oscillation unit), and a signal processing circuit (detection unit), so that self-oscillation driving is performed independently for each axis.

When the two tuning-fork piezoelectric vibrators, which perform mechanical in-plane vibrations, are mounted on a single module, a difference in frequency between the two oscillation frequencies affects the oscillation frequency of each of the tuning-fork piezoelectric vibrators. This is due to mechanical propagation, aerial propagation, electrical propagation, and other characteristics of the vibrations. When a signal on which a difference frequency component is superimposed is synchronously detected by a detection circuit for each axis, the difference in frequency component appears as an interference wave in the output of the vibrating gyroscope. For example, when oscillation frequencies for first and second axes are about 25 kHz and about 31 kHz, respectively, a difference in frequency of about 6 kHz appears as an interference wave in the gyroscope output for each axis.

Figure 1A:
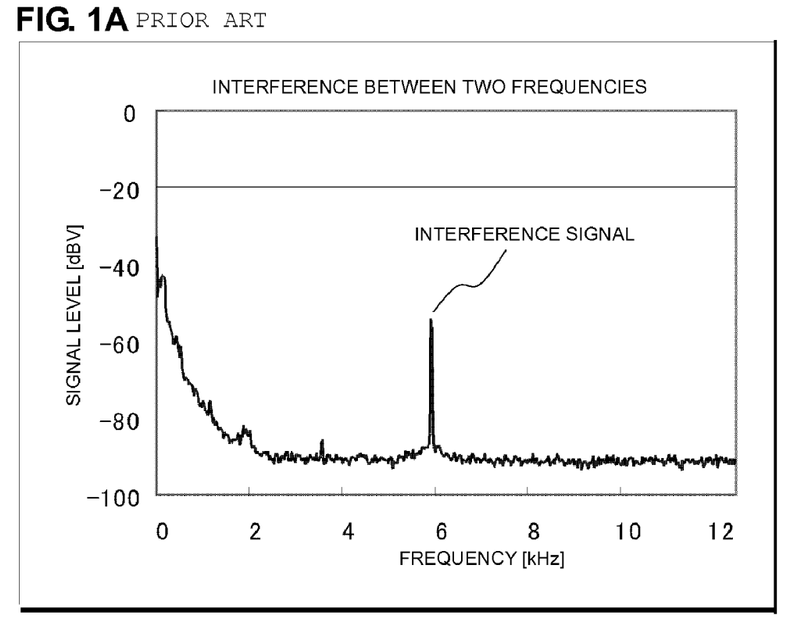
FIG. 1A and FIG. 1B are graphs showing examples of interference caused by a difference in drive frequency between two piezoelectric vibrators.
Figure 1B:
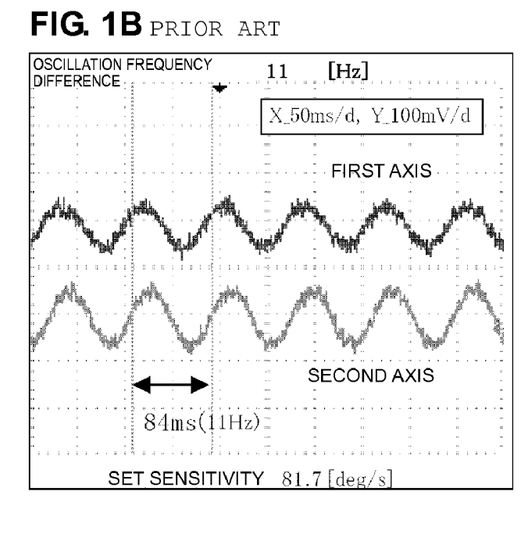

FIG. 1A and FIG. 1B illustrate examples of the interference described above. In the graph shown in FIG. 1A, the horizontal axis represents frequency and the vertical axis represents the level of an output signal of a vibrating gyroscope. In the example of FIG. 1A, an interference signal having a difference in frequency of about 6 kHz appears. In the graph shown in FIG. 1B, the horizontal axis represents time and the vertical axis represents the output signal level of the vibrating gyroscope for each axis. In the example of FIG. 1B, fluctuation components observed when a difference in oscillation frequency is about 11 Hz appear in output signals of the vibrating gyroscope for the two axes.

A camera in which the vibrating gyroscope is mounted amplifies the output signal of the vibrating gyroscope, converts the amplified signal into a discrete value through an analog-to-digital (AD) converter, sends the discrete value to a microcomputer, and calculates the amount of correction of motion blur caused by hand shake. If the level of noise resulting from an interference wave component is high enough to deviate from the resolution of the AD converter, erroneous detection of an angular velocity may occur.

Examples of a method for reducing such interference noise include a method in which oscillation frequencies of two vibrators are widely separated from each other, and a method in which an interference wave is attenuated by providing a filter.

However, the angular velocity sensitivity of a vibrator is inversely proportional to a difference in oscillation frequency. For example, if a difference in frequency between two axes of the vibrators is about 5 kHz, a sensitivity difference of about 25% will result. Therefore, when the oscillation frequencies of the two vibrators are widely separated from each other, a considerable difference in sensitivity of the vibrating gyroscope is observed between the two axes. As a result, a signal-to-noise (S/N) ratio of the piezoelectric vibrator having a higher oscillation frequency is degraded.

When a filter for attenuating an interference wave is providing, the frequency of the interference wave (i.e., a difference in frequency between two axes) is about 1/5 to about 1/15 of the oscillation frequencies for the two axes. Therefore, for example, it is necessary to provide several stages of low-pass filters (LPFs) having a cutoff frequency fc as low as about 300 Hz. However, insertion of stacked low-pass filters may affect the primary sensitivity range (from direct current (DC) to about 50 Hz) of the vibrating gyroscope, degrade the response characteristics of the vibrating gyroscope, and cause an increase in phase delay with respect to an applied angular velocity.

Figure 2:
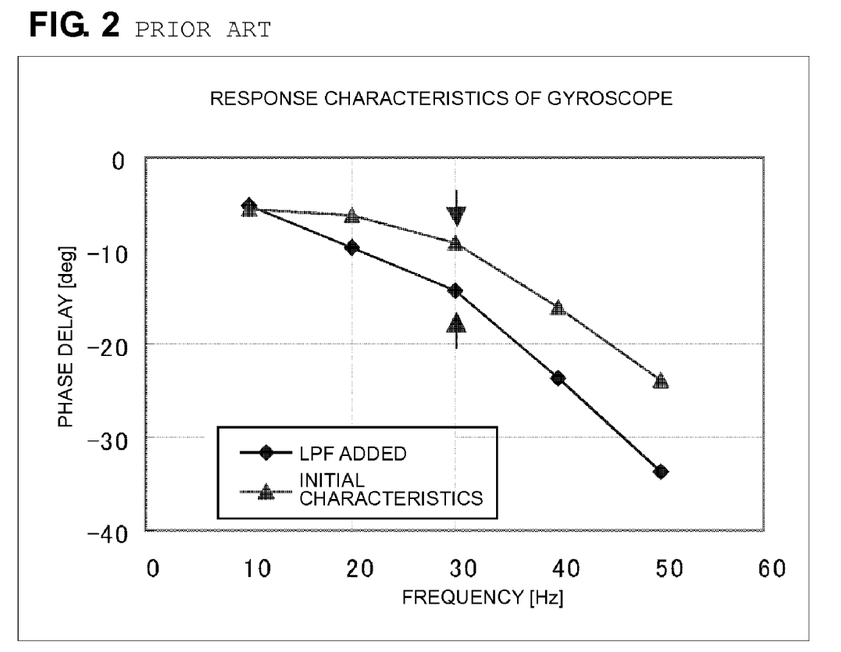
FIG. 2 is a graph showing an example of different response characteristics of a vibrating gyroscope depending on the presence or absence of a low-pass filter.

FIG. 2 is a graph showing an example of different response characteristics of a vibrating gyroscope depending on the presence or absence of a low-pass filter. In the graph of FIG. 2, the horizontal axis represents the frequency of angular velocity, that is, the frequency of an input signal to the low-pass filter, while the vertical axis represents the phase delay. In the example shown in FIG. 2, by providing the low-pass filter, a phase delay at a frequency of about 30 Hz increases by about 5 degrees.

Japanese Patent No. 3698787 describes a multi-axis vibrating gyroscope including a plurality of piezoelectric vibrators, an oscillation drive circuit, and a detection circuit. The vibrating gyroscope includes one oscillation circuit arranged to cause a piezoelectric vibrator for a first axis to self-oscillate. Another piezoelectric vibrator for at least one remaining axis is caused to oscillate under excitation using an oscillation signal for the first axis.

Figure 3:
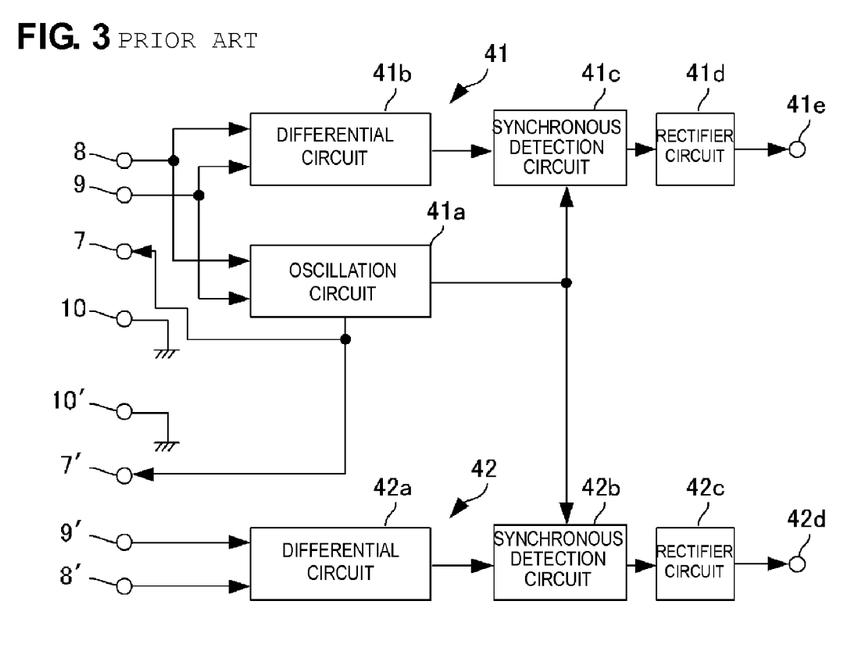
FIG. 3 is a block diagram illustrating an example of a drive detection unit included in a vibrating gyroscope described in Japanese Patent No. 3698787.

FIG. 3 is a block diagram illustrating an example of a drive detection unit included in the vibrating gyroscope described in Japanese Patent No. 3698787. This vibrating gyroscope includes a drive detection circuit 41 and a detection circuit 42, which are respectively connected to two different piezoelectric vibrators (first and second piezoelectric vibrators) arranged with a space therebetween.

The drive detection circuit 41 includes an oscillation circuit 41a, a differential circuit 41b, a synchronous detection circuit 41c, and a rectifier circuit 41d. The detection circuit 42 includes a differential circuit 42a, a synchronous detection circuit 42b, and a rectifier circuit 42c.

The first piezoelectric vibrator is connected to terminals 7, 8, 9, and 10 of the drive detection circuit 41, while the second piezoelectric vibrator is connected to terminals 7', 8', 9', and 10' of the detection circuit 42.

In the drive detection circuit 41, the oscillation circuit 41a is connected to detection electrodes of the first piezoelectric vibrator, a drive electrode of the first piezoelectric vibrator, and the synchronous detection circuit 41c so as to define a self-oscillation circuit. At the same time, the oscillation circuit 41a is connected to a drive electrode of the second piezoelectric vibrator and the synchronous detection circuit 42b. With this configuration, an oscillation signal from the oscillation circuit 41*a* is supplied as a drive signal to the first and second piezoelectric vibrators, which are thus driven.

A detection signal from the first piezoelectric vibrator is supplied to the differential circuit 41*b* and differentially amplified.

The oscillation signal from the oscillation circuit 41*a* is supplied as a synchronous detection signal to the synchronous detection circuit 41*c*. The synchronous detection circuit 41*c* detects the differentially amplified signal in synchronization with the synchronous detection signal, and outputs the differentially amplified signal as a detection signal. The detection signal is rectified by the rectifier circuit 41*d* and output from an output terminal 41*e* as a first detection voltage signal.

Similarly, a detection signal from the second piezoelectric vibrator is supplied through the terminals 8' and 9' to the differential circuit 42*a*. The synchronous detection circuit 42*b* detects the output of the differential circuit 42*a* in synchronization with the synchronous detection signal, and outputs the output of the differential circuit 42*a* as a detection signal. The detection signal is rectified by the rectifier circuit 42*c* and output from an output terminal 42*d* as a second detection voltage signal.

Japanese Unexamined Patent Application Publication No. 2007-285977 describes a multi-axis angular velocity sensor including a plurality of tuning-fork vibrators. In such an angular velocity sensor including two tuning-fork vibrators, the drive frequencies (oscillation frequencies) of the two tuning-fork vibrators are separated such that a difference in resonance frequency between the two tuning-fork vibrators (f1–f2) is at least about 2% of an average favg of the resonance frequencies of the two tuning-fork vibrators. Thus, by separating the oscillation frequencies of the two tuning-fork vibrators by at least a specified value, interference noise between circuits including the two tuning-fork vibrators is reduced.

Japanese Unexamined Patent Application Publication No. 2006-322874 describes a multi-axis vibrating gyroscope including a plurality of tuning-fork vibrators. In the vibrating gyroscope, only arm lengths of each of the tuning-fork vibrators are varied such that a difference in oscillation frequency between the tuning-fork vibrators is adjusted to be at least about 1 kHz. Thus, interference noise between axes is reduced.

With the configuration described in Japanese Patent No. 3698787, since the first piezoelectric vibrator is driven by self-oscillation, it is easy to obtain gyroscope characteristics that match the resonance frequency of the first piezoelectric vibrator. However, since the second piezoelectric vibrator is driven by excitation, and is thus excited at a non-resonance point, it is difficult to obtain original gyroscope characteristics. Moreover, since the first and second piezoelectric vibrators differ considerably from each other in gyroscope characteristics, a large amount of characteristic correction must be performed by appropriate circuits.

With the configurations described in Japanese Unexamined Patent Application Publications Nos. 2007-285977 and 2006-322874, even when the resonance frequencies of the tuning-fork vibrators are separated from each other, interference noise is generated to some extent. Moreover, as a difference in resonance frequency between the tuning-fork vibrators increases, a difference in gyroscope sensitivity between axes increases.

As described in Japanese Unexamined Patent Application Publication No. 2006-322874, when a low-pass filter is provided on a detection circuit side, interference noise is attenuated as a cutoff frequency of the low-pass filter is reduced. However, at the same time, this causes degradation in response characteristics of the vibrating gyroscope (i.e., delay of a sensor output signal with respect to an angular velocity).

SUMMARY OF THE INVENTION

To overcome the problems described above, preferred embodiments of the present invention provide a vibrating gyroscope that does not experience problems such as interference noise caused by a difference in drive frequency between piezoelectric vibrators and degradation of response characteristics caused by providing a low-pass filter to eliminate interference frequency components, and that is capable of providing high sensitivity and uniform sensitivity characteristics for detection of angular velocities using the piezoelectric vibrators.

A vibrating gyroscope according to a preferred embodiments of the present invention includes an oscillation circuit having a piezoelectric vibrator and a feedback-signal processing circuit including input buffers, an adding circuit, an amplitude control circuit, and a phase-shift circuit configured to input a detection voltage signal of the piezoelectric vibrator and feed back a drive voltage signal to the piezoelectric vibrator, and a detection circuit including a differential amplifier circuit and a synchronous detection circuit configured to detect an electromotive voltage signal (differential signal) generated by vibrations of the piezoelectric vibrator caused by Coriolis force. In the vibrating gyroscope, a plurality of the piezoelectric vibrators are arranged to have different detection axes. The detection circuit is provided for each of the plurality of piezoelectric vibrators. The feedback-signal processing circuit inputs the detection voltage signal of each of the plurality of piezoelectric vibrators, and applies a common drive voltage signal to the plurality of piezoelectric vibrators.

With this configuration, drive frequencies of the plurality of piezoelectric vibrators are substantially equal to one another, and substantially no interference noise is generated. Since this eliminates the need of an additional filter to remove interference noise, it is possible to prevent degradation of response characteristics caused by including such a filter. Additionally, since the vibrating gyroscope includes only one common oscillation circuit, the size and cost of an integrated circuit (IC) defining a signal processing circuit including the above-described components can be reduced.

In the vibrating gyroscope, the detection circuit may preferably include a differential amplifier circuit arranged to differentially amplify the detection voltage signal and a synchronous detection circuit arranged to detect the differentially amplified signal in synchronization with an oscillation cycle of the oscillation circuit. The vibrating gyroscope may preferably further include a reference-phase-signal generating circuit including a detection-timing generating circuit and a phase-shift circuit arranged to generate a reference phase signal for the synchronous detection in accordance with a phase of an oscillation signal of the oscillation circuit, the oscillation signal being extracted from the feedback-signal processing circuit, and supply the reference phase signal to the synchronous detection circuit.

Thus, as the oscillation circuit described above, the vibrating gyroscope includes only one common circuit arranged to generate a reference phase signal necessary for synchronous detection in each detection circuit. Therefore, the size and cost of the IC defining the signal processing circuit can be reduced.

In the vibrating gyroscope, the plurality of piezoelectric vibrators may preferably be adjusted by trimming, for example, such that resonance frequencies of the plurality of piezoelectric vibrators are close to each other within a ΔF value corresponding to a difference between a resonance frequency and an antiresonance frequency of any of the plurality of piezoelectric vibrators.

Thus, since the oscillation circuit has a single oscillation frequency and S/N characteristics for all of the detection axes are close to each other, uniform angular-velocity detection characteristics can be obtained.

The vibrating gyroscope may preferably further include a DC amplifier filter arranged to correct, for an output signal of the synchronous detection circuit, a characteristic curve of an output voltage corresponding to an angular velocity, and a characteristic correcting circuit arranged to set correction data (i.e., data for correcting gyroscope characteristics, such as sensitivity, offset, sensitivity temperature characteristics, and offset temperature characteristics) for the DC amplifier filter. In the vibrating gyroscope, the DC amplifier filter and the characteristic correcting circuit may be provided for each of the plurality of piezoelectric vibrators.

This configuration makes it possible to achieve substantially the same gyroscope characteristics (e.g., sensitivity, offset, sensitivity temperature characteristics, and offset temperature characteristics) for all of the detection axes.

According to various preferred embodiments of the present invention, it is possible to drive a plurality of piezoelectric vibrators at substantially the same resonance frequency, and provide uniform and high-sensitivity characteristics. Additionally, since no interference noise is generated, there is no need to provide a low-pass filter to eliminate such interference noise. Therefore, it is possible to prevent degradation in response characteristics caused by providing such a low-pass filter. Moreover, for example, since only one common oscillation circuit is provided, the size and cost of an IC are reduced.

Other features, elements, arrangements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 6:
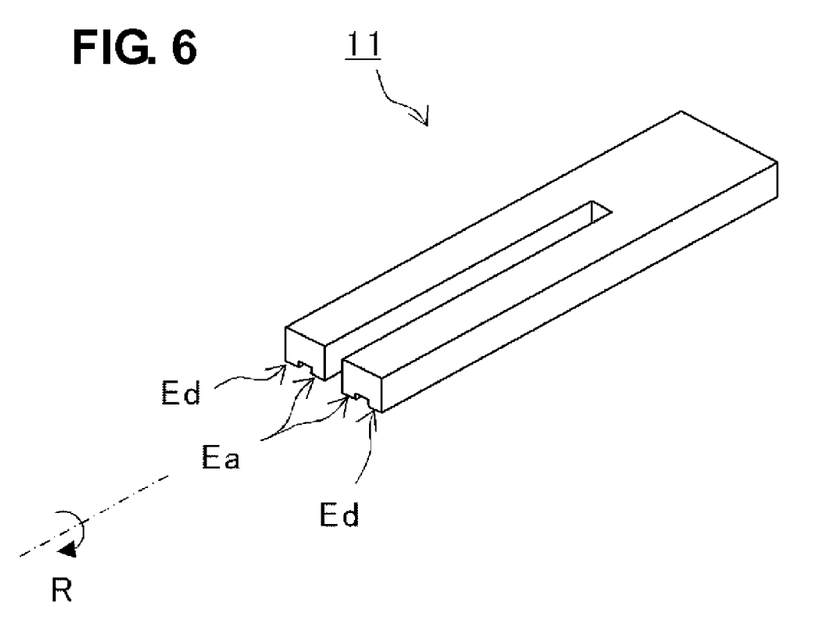
FIG. 6 is a perspective view of a piezoelectric vibrator.

FIG. 6 is a perspective view of a piezoelectric vibrator 11. The piezoelectric vibrator 11 is produced by bonding two polarized piezoelectric substrates together such that their directions of polarization are opposite to each other, and forming the resulting body into a tuning fork shape. As illustrated in FIG. 6, the tuning-fork piezoelectric vibrator 11 is provided with electrodes Ed and Ea on the bottom surface of a pair of legs. The piezoelectric vibrator 11 may preferably be formed by integrally firing a laminated piezoelectric body including a metal film internally arranged in the direction of thickness. Applying a drive voltage between the electrodes Ed and Ea causes basic vibrations of the pair of legs of the piezoelectric vibrator 11 in the left-right opening-closing direction.

When an angular velocity is applied to the piezoelectric vibrator 11 in the R-direction shown in FIG. 6, the Coriolis force causes the pair of legs of the piezoelectric vibrator 11 to oppositely vibrate in the up-down direction in FIG. 6.

An intermediate metal film not connected to any circuit is provided on an intermediate layer in the direction of thickness of the piezoelectric vibrator 11. Electromotive voltages of opposite polarities corresponding to the Coriolis force are generated between the intermediate metal film and the electrode Ed on the right side and between the intermediate metal film and the electrode Ed on the left side. Another metal film may or may not be provided on a principal surface opposite to the bottom surface (principal surface) on which the electrodes Ed and Ea of the piezoelectric vibrator 11 are arranged.

Figure 4:
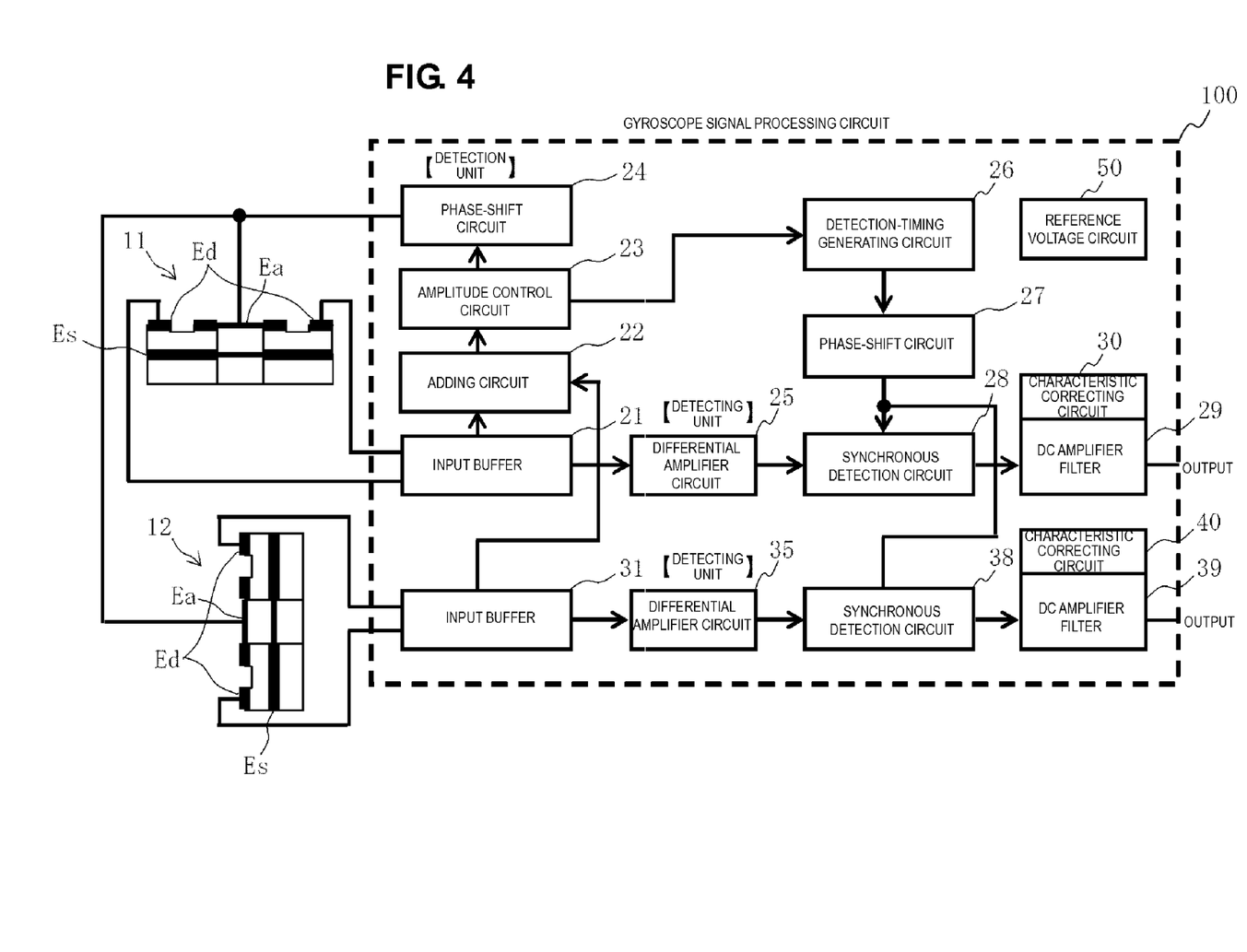
FIG. 4 is a block diagram illustrating a configuration of a vibrating gyroscope according to a first preferred embodiment of the present invention.
Figure 5:
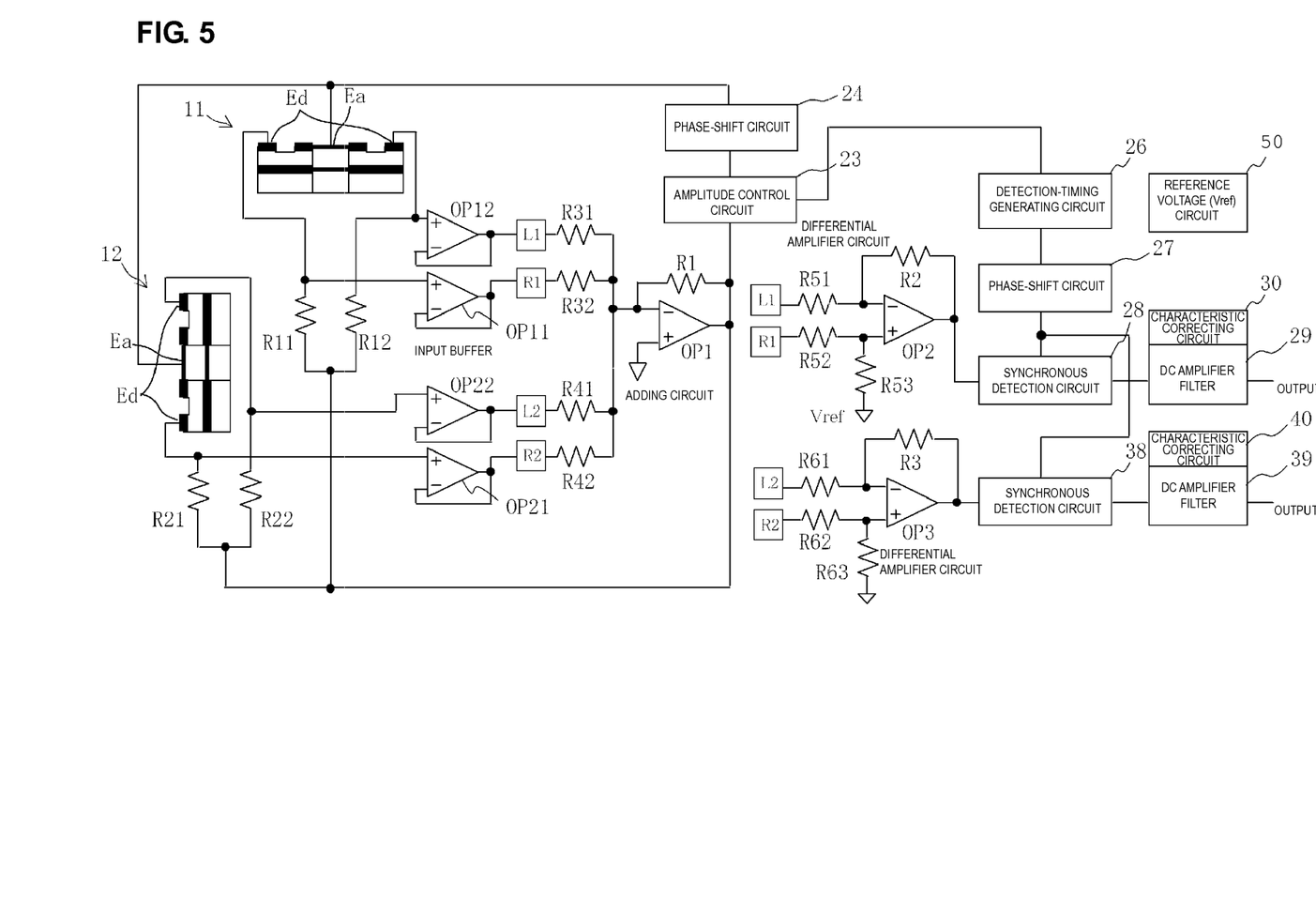
FIG. 5 is a circuit diagram of input buffers, an adding circuit, and differential amplifier circuits illustrated in FIG. 4.

FIG. 4 is a block diagram illustrating a configuration of a vibrating gyroscope according to a first preferred embodiment of the present invention. FIG. 5 is a circuit diagram of input buffers 21 and 31, an adding circuit 22, and differential amplifier circuits 25 and 35 illustrated in FIG. 4.

Referring to FIG. 4, the piezoelectric vibrator 11 includes the electrodes Ed and Ea and an intermediate metal film Es as described above. The other piezoelectric vibrator 12 has the same or substantially the same configuration as that of the piezoelectric vibrator 11.

The input buffer 21 inputs detection voltage signals appearing at the electrodes Ed (hereinafter referred to as detection electrodes Ed) at high impedance, and outputs the detection voltage signals as a low-impedance voltage signal. The input buffer 31 inputs voltages appearing at the detection electrodes Ed of the piezoelectric vibrator 12 at high impedance, and outputs the voltages as a low-impedance voltage signal.

The adding circuit 22 adds up the output voltages of the input buffers 21 and 31, while an amplitude control circuit 23 controls the amplitude of the output voltage of the adding circuit 22 to be constant or substantially constant. Thus, a loop gain is automatically controlled.

A phase-shift circuit 24 controls the phase of a drive voltage signal supplied to the piezoelectric vibrators 11 and 12 such that a loop including the input buffers 21 and 31, the adding circuit 22, the amplitude control circuit 23, the phase-shift circuit 24, and the piezoelectric vibrators 11 and 12 performs an oscillation operation.

The above-described loop including the piezoelectric vibrators 11 and 12, the input buffers 21 and 31, the adding circuit 22, the amplitude control circuit 23, and the phase-shift circuit 24 defines an oscillation circuit.

The input buffers 21 and 31, the adding circuit 22, the amplitude control circuit 23, and the phase-shift circuit 24 define a "feedback-signal processing circuit" according to a preferred embodiment of the present invention.

Thus, since a potential difference is supplied between the electrode Ea (hereinafter referred to as drive electrode Ea) and the two detection electrodes Ed in each of the piezoelectric vibrators 11 and 12, the piezoelectric vibrators 11 and 12 vibrate in the plane of the tuning-fork shape in the opening-closing direction as described above. At this point, the oscillation frequencies continuously self-oscillate with a constant or substantially constant amplitude at unique resonance frequencies of the piezoelectric vibrators 11 and 12.

When an angular velocity occurs about a detection axis of each of the piezoelectric vibrators 11 and 12, out-of-plane vibrations of the piezoelectric vibrators 11 and 12 are excited. Thus, a potential difference is generated between the two detection electrodes Ed of each of the piezoelectric vibrators 11 and 12.

The differential amplifier circuits 25 and 35 each differentially amplify the potential difference to obtain an electromotive voltage signal generated by vibrations of each of the piezoelectric vibrators 11 and 12 caused by Coriolis force. Synchronous detection circuits 28 and 38 each synchronously detect the differentially-amplified voltage signal in synchronization with an oscillation cycle of the oscillation frequency.

A detection-timing generating circuit 26 inputs an oscillation signal received from the input or output side of the amplitude control circuit 23, and generates a reference phase signal for synchronous detection. A phase-shift circuit 27 shifts the reference phase signal by an amount of phase necessary for synchronous detection, and supplies the resulting signal to both of the synchronous detection circuits 28 and 38 as a final reference phase signal for synchronous detection.

The detection-timing generating circuit 26 and the phase-shift circuit 27 define a "reference-phase-signal generating circuit" according to a preferred embodiment of the present invention. A set of the differential amplifier circuit 25 and the synchronous detection circuit 28, and a set of the differential amplifier circuit 35 and the synchronous detection circuit 38 each define a "detection circuit" according to a preferred embodiment of the present invention.

Thus, synchronous detection is performed on a differential signal between the two detection electrodes Ed of each of the piezoelectric vibrators 11 and 12 using an oscillation frequency of a single oscillation loop system as a reference signal for the synchronous detection.

DC amplifier filters 29 and 39 DC-amplify output voltages from the synchronous detection circuits 28 and 38 with predetermined gains, convert impedances of the resulting voltages, and output voltage signals at low impedances. The output voltage signals are proportional to angular velocities about the respective detection axes of the piezoelectric vibrators 11 and 12.

Characteristic correcting circuits 30 and 40 correct respective gains and offsets of the DC amplifier filters 29 and 39 so as to correct characteristics (i.e., characteristic curves), such as gains and offsets of output voltages with respect to the angular velocities, temperature characteristics, and other characteristics.

A reference voltage circuit 50 supplies necessary reference voltages to various circuits.

Referring to FIG. 5, resistors R11 and R12 and operational amplifiers OP11 and OP12 define the input buffer 21 illustrated in FIG. 4. Similarly, resistors R21 and R22 and operational amplifiers OP21 and OP22 define the input buffer 31 illustrated in FIG. 4.

Resistors R31, R32, R41, R42, and R1 and an operational amplifier OP1 of FIG. 5 define the adding circuit 22 illustrated in FIG. 4.

Resistors R51, R52, R53, and R2 and an operational amplifier OP2 of FIG. 5 define the differential amplifier circuit 25 illustrated in FIG. 4. Similarly, resistors R61, R62, R63, and R3 and an operational amplifier OP3 define the differential amplifier circuit 35 illustrated in FIG. 4.

The resistors R11 and R12 are preferably detection resistors (load resistors) that detect voltages appearing at the detection electrodes Ed of the piezoelectric vibrator 11. The voltages at the detection electrodes Ed of the piezoelectric vibrator 11 are input to respective non-inverting input terminals of the operational amplifiers OP11 and OP12. The operational amplifiers OP11 and OP12 allow direct feedback of their outputs to the respective inverting input terminals, and thus, function as a voltage-follower buffer circuit.

Similarly, the resistors R21 and R22 are preferably detection resistors that detect voltages appearing at the detection electrodes Ed of the piezoelectric vibrator 12. The voltages at the detection electrodes Ed of the piezoelectric vibrator 12 are input to respective non-inverting input terminals of the operational amplifiers OP21 and OP22. The operational amplifiers OP21 and OP22 allow direct feedback of their outputs to the respective inverting input terminals, and thus function as a voltage-follower buffer circuit.

The resistors R31, R32, R41, and R42 preferably have the same or substantially the same resistance value, and simply add up the output voltages of the operational amplifiers OP11, OP12, OP21, and OP22.

The voltages at the detection electrodes Ed are changed in directions opposite to each other because of the Coriolis force generated when angular velocities about the detection axes are applied. Thus, voltage signals corresponding to the angular velocities are output from the respective piezoelectric vibrators 11 and 12.

A voltage obtained by differentially amplifying the output voltages of the operational amplifiers OP11 and OP12 is preferably output from the operational amplifier OP2, and a voltage obtained by differentially amplifying the output voltages of the operational amplifiers OP21 and OP22 is preferably output from the operational amplifier OP3.

Even if a potential difference between the detection electrodes Ed is generated by the Coriolis force, an adding operation performed by the operational amplifier OP1 cancels the resulting fluctuations and allows the oscillation loop to stably operate with constant or substantially constant amplitude.

Each of the piezoelectric vibrators 11 and 12 are preferably driven when a drive voltage is applied between the drive electrode Ea and the detection electrodes Ed and a signal having a phase opposite that of the detection electrodes Ed is supplied to ends of the detection resistors, the ends being distant from the detection electrodes Ed. With this driving method, the amount of current flowing through the resistors R11, R12, R21, and R22 (detection resistors) increases, and thus, the signal component of the S/N ratio is improved.

Figure 7:
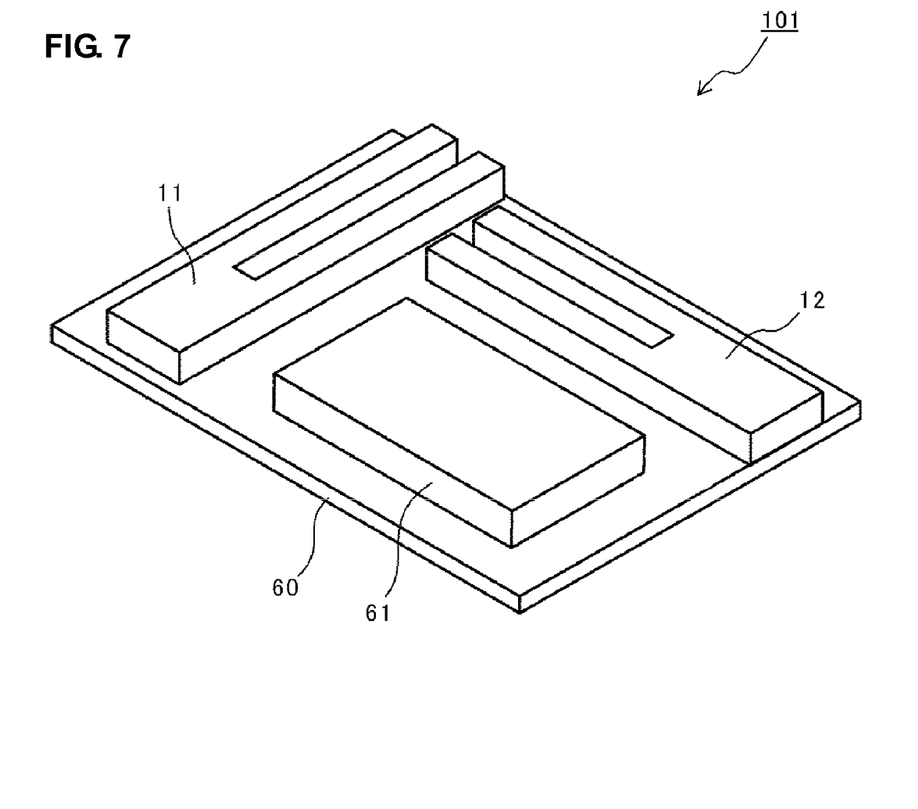
FIG. 7 is a perspective view of an entire vibrating gyroscope.

FIG. 7 is a perspective view of an entire vibrating gyroscope 101. Preferably, the two piezoelectric vibrators 11 and 12 are arranged on the upper surface of a substrate 60 such that their detection axes are parallel or substantially parallel to the substrate 60 and perpendicular or substantially perpendicular to each other. An IC chip 61 and various chip components, such as chip capacitors and chip resistors (not shown), defining a gyroscope signal processing circuit 100 (see FIG. 4 and FIG. 5) are preferably surface-mounted on the upper surface of the substrate 60. The substrate 60 is preferably provided with a cap (not shown) which covers the above-described components on the upper surface of the substrate 60. Power-supply terminal electrodes and output terminal electrodes are preferably disposed on the undersurface of the substrate 60. The vibrating gyroscope 101 is preferably surface-mounted on a circuit board of an apparatus on which the vibrating gyroscope 101 is to be installed.

As illustrated in FIG. 4 and FIG. 5, the two piezoelectric vibrators 11 and 12 are preferably connected in parallel to each other and driven by one oscillation loop system. Since the resonance frequencies of the two piezoelectric vibrators 11 and 12 are relatively close to each other, the two piezoelectric vibrators 11 and 12 behave as a single composite vibrator and self-oscillate at a single oscillation frequency. In practice, the two piezoelectric vibrators 11 and 12 oscillate at an intermediate frequency between their resonance frequencies.

Figure 8:
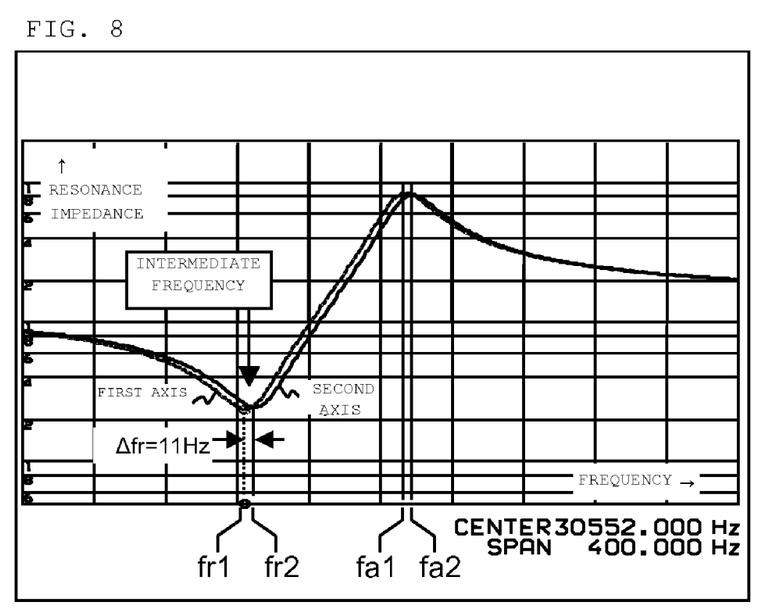
FIG. 8 is a graph showing a relationship between resonance characteristics and an oscillation point of piezoelectric vibrators.

FIG. 8 is a graph showing a relationship between resonance characteristics and an oscillation point of the piezoelectric vibrators 11 and 12. The piezoelectric vibrator 11 (corresponding to the first axis) and the piezoelectric vibrator 12 (corresponding to the second axis) differ from each other in their resonance impedance characteristics. In the example shown in FIG. 8, a difference $\Delta fr$ between a resonance frequency fr1 of the piezoelectric vibrator 11 and a resonance frequency fr2 of the piezoelectric vibrator 12 is preferably about 11 Hz, for example. The piezoelectric vibrators 11 and 12 self-oscillate at an intermediate frequency between the two resonance frequencies fr1 and fr2 (i.e., at about (fr1+fr2)/2).

The two piezoelectric vibrators 11 and 12 are preferably trimmed by laser light irradiation or other suitable method, for example, such that their resonance impedance characteristics are close to each other, such as in resonance frequency, resonant resistance, and mistuned frequency (i.e., a difference between a drive resonance frequency and a detected resonance frequency). As a guide, the resonance frequencies of the piezoelectric vibrators 11 and 12 are preferably close to each other such that the difference therebetween falls within a $\Delta F$ value (i.e., a difference between a resonance frequency and an antiresonance frequency of one of the piezoelectric vibrators 11 and 12).

Referring to FIG. 8, the piezoelectric vibrators 11 and 12 have antiresonance frequencies fa1 and fa2, respectively. With the trimming described above, the difference between the resonance frequencies fr1 and fr2 is preferably less than a value of (fa1−fr1) or (fa2−fr2), for example.

As described above, in mass production, it is difficult to produce two piezoelectric vibrators having exactly the same characteristics. This means that the two piezoelectric vibrators may slightly differ from each other in resonance frequency and mistuned frequency. As a result, the two piezoelectric vibrators preferably oscillate at about an intermediate frequency between their resonance frequencies, so that synchronous detection is performed using the oscillation signal as a reference signal. Therefore, there is a difference in detection phase between angular velocity signals detected by the synchronous detection circuits 28 and 38, differences in gyroscope characteristics may be observed.

The characteristic correcting circuits 30 and 40 (see FIG. 4 and FIG. 5) perform correction to eliminate differences in gyroscope characteristics, such as sensitivity, offset, sensitivity temperature characteristics, and offset temperature characteristics. For the correction, the gyroscope characteristics are measured in a manufacturing process. Then, correction data is sent to the characteristic correcting circuits 30 and 40 so that specified characteristics can be ensured.

Figure 9:
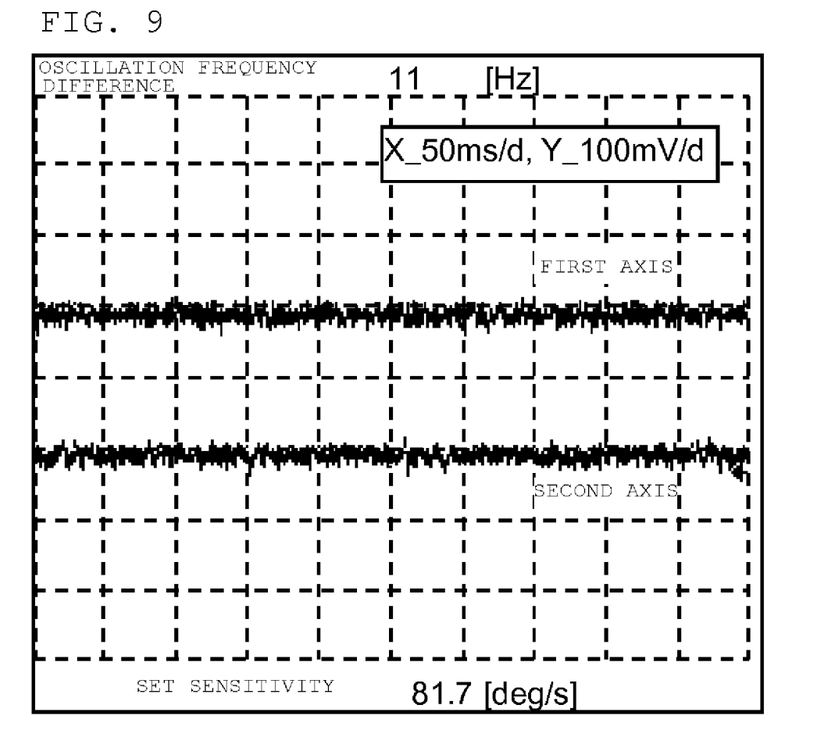
FIG. 9 is a graph showing temporal waveforms of two output signals of a vibrating gyroscope observed when an angular velocity about each detection axis is zero.

FIG. 9 is a graph showing temporal waveforms of two output signals of the vibrating gyroscope 101 observed when an angular velocity about each detection axis is approximately zero, that is, when the vibrating gyroscope 101 is at rest. In the graph of FIG. 9, the horizontal axis represents time, and the vertical axis represents the output signal level of the vibrating gyroscope 101 for each axis. Since the two piezoelectric vibrators 11 and 12 are driven at the same or substantially the same frequency, there is no occurrence of interference such as that shown in FIG. 1B.

Thus, it is possible to provide a two-axis vibrating gyroscope that is inexpensive, has high-performance, and is free from interference.

In the above-described preferred embodiments, a vibrating gyroscope including two piezoelectric vibrators and having two detection axes has been described as an example. However, the present invention is also applicable to a vibrating gyroscope including three or more piezoelectric vibrators and having three or more detection axes perpendicular or substantially perpendicular to each other. Specifically, to provide a vibrating gyroscope having three detection axes, the vibrating gyroscope may preferably include another set of the piezoelectric vibrator 12, the input buffer 31, the differential amplifier circuit 35, the synchronous detection circuit 38, the DC amplifier filter 39, and the characteristic correcting circuit 40 illustrated in FIG. 4 so as to obtain an output for the third axis.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A vibrating gyroscope comprising:
   an oscillation circuit including a piezoelectric vibrator and a feedback-signal processing circuit arranged to input a detection voltage signal of the piezoelectric vibrator and feed back a drive voltage signal to the piezoelectric vibrator; and
   a detection circuit arranged to detect an electromotive voltage signal generated by vibrations of the piezoelectric vibrator caused by a Coriolis force; wherein
   a plurality of the piezoelectric vibrators are arranged to have different detection axes;
   each of the plurality of piezoelectric vibrators includes a drive electrode and detection electrodes;
   both detection voltage signal and the electromotive voltage signal are output from the same detection electrodes of each of the plurality of piezoelectric vibrators;
   the detection circuit is provided for each of the plurality of piezoelectric vibrators; and
   the feedback-signal processing circuit is arranged to input the detection voltage signal from the detection electrodes of each of the plurality of piezoelectric vibrators, and to apply a common drive voltage signal to the drive electrodes of all of the plurality of piezoelectric vibrators contained in the vibrating gyroscope.

2. The vibrating gyroscope according to claim 1, wherein the detection circuit includes a differential amplifier circuit arranged to differentially amplify the detection voltage signal and a synchronous detection circuit arranged to detect the differentially amplified signal in synchronization with an oscillation cycle of the oscillation circuit;
   the vibrating gyroscope further comprises a reference-phase-signal generating circuit arranged to generate a reference phase signal for the synchronous detection in accordance with a phase of an oscillation signal of the oscillation circuit, the oscillation signal being extracted from the feedback-signal processing circuit, and to supply the reference phase signal to the synchronous detection circuit.

3. The vibrating gyroscope according to claim 1, wherein resonance frequencies of the plurality of piezoelectric vibrators are close to each other within a ΔF value corresponding to a difference between a resonance frequency and an antiresonance frequency of any of the plurality of piezoelectric vibrators.

4. The vibrating gyroscope according to claim 1, further comprising:

a direct-current amplifier filter arranged to correct, for an output signal of the synchronous detection circuit, a characteristic curve of an output voltage corresponding to an angular velocity; and a characteristic correcting circuit arranged to set correction data for the direct-current amplifier filter; wherein the direct-current amplifier filter and the characteristic correcting circuit are provided for each of the plurality of piezoelectric vibrators.

\* \* \* \* \*